3,257,398
POLYCYCLIC ACIDS, ANHYDRIDES, IMIDES
AND AMINES
Charles H. Grogan, Falls Church, Va., and Leonard M. Rice, Minneapolis, Minn., assignors, by mesne assignments, to Tri-Kem Corporation, Washington, D.C., a corporation of the District of Columbia
No Drawing. Filed Dec. 10, 1962, Ser. No. 243,617
13 Claims. (Cl. 260—247.5)

The present invention relates to novel organic compounds, novel intermediates which are useful in the preparation of such compounds and methods for the preparation of such compounds and intermediates. More specifically, the present invention relates to azadispirodiones and azadispiranes which have valuable pharmacological properties, and to polycyclic acids and anhydrides useful in their preparation.

The present application has a number of significant objects. A primary object of the present application is to provide novel, pharmacologically active organic compounds and methods for their preparation, said compounds being characterized primarily by their activity on the central nervous system.

It is another principal object of the present invention to provide novel azadispiro compounds having a great variety of pharmacological properties among which are antihistaminic characteristics, ganglionic blocking characteristics, analeptic properties and central nervous stimulant and depressant properties.

It is a further object of the present invention to provide novel compounds which are useful in preparing the above compounds.

These and other objects of the instant application will become more apparent as the description proceeds below and when reference is made to the several appended claims.

The compounds of the present invention may be divided into six groups, (1) the intermediate azadispirodiones, (2) the azadispiranes prepared from said azadispirodiones, (3) and (4) the spiro acids and anhydrides used to prepare the intermediate azadispirodiones, (5) the simple acid addition salts of said first two groups of compounds and (6) the quaternary salts of said first two groups of compounds.

The novel azadispirodiones of the present invention are illustrated in Formula I:

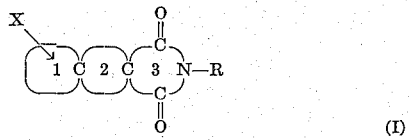

(I)

In the above formula, ring 1 is a mono- or bicyclic ring of at least five ring atoms, which are preferably carbon. While there is no particular upper limit on the number of atoms in ring 1, a ring of from five to fifteen atoms is preferred. Ring 2 is a ring of five or six ring atoms, which is preferably a carbocyclic ring. Ring 3 is also a ring of five or six atoms, one of which is nitrogen. As will be noted from Formula I, ring 3 contains two carbonyl carbons, one on either side of the nitrogen atom. Preferably, all of the ring atoms in ring 3 other than the nitrogen atom are carbon.

Substituent X on ring 1 may be one or more of hydrogen, alkyl, alkenyl or alkoxy. While there is no practical upper limit on the chain length of the alkyl, alkenyl or alkoxy groups which may represent X, a preferred upper limit is 6 chain atoms. The substituent R is selected from the group consisting of: (a) hydrogen; (b) alkyl; (c) alkenyl; (d) alkoxyalkyl; (e) alkynyl; (f) cycloalkyl; (g) aryl; (h) a heterocyclic group selected from the class consisting of morpholino, pyrrolidino and piperidino and piperazino; and (i) —R'—R", wherein R' is selected from the group consisting of alkylene, alkenylene, and alkylene and alkenylene substituted by a hydroxyl group on a carbon atom at least β to all nitrogen atoms; and R" is selected from the group consisting of: aryl, cycloalkyl; dialkylamino or alkylamino, the nitrogen atom of which is attached to R'; dialkenylamino or alkenylamino, the nitrogen atom of which is attached to R'; and a heterocyclic group selected from the group consisting of morpholino, pyrrolidino, piperidino and piperazino, a nitrogen atom of which is connected to R'. While there is no particular upper limit on the number of chain atoms in the alkyl, alkenyl, alkoxyalkyl or alkynyl groups designated by the letters (a)–(e) or on the number of ring atoms in the cycloalkyl or aryl groups (f) and (g), a preferred upper limit with respect to each of these is 22 chain or ring atoms. While there is no particular upper limit on the number of chain atoms in R', groups of up to 10 chain atoms are desirable and those up to 6 are especially preferred. Also, while there are no upper limits on the number of chain atoms in the dialkyl, dialkenyl, alkyl or alkenyl groups forming a portion of the R" substituent, a preferred upper limit on these groups is 6 chain atoms per group.

The novel azadispiranes of the present invention are set forth below in Formula II:

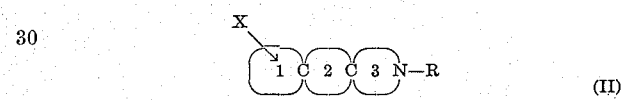

(II)

In the above structure, all of the symbols have the same significance set forth in connection with the compounds of Formula I, the only difference between the compounds of Formula II and Formula I is that the former do not contain the two oxygen atoms in ring 3 contained by the latter. As will be shown below, the compounds of Formula II may be made by reducing the carbonyl groups of ring 3 in Formula I.

The novel azadispirodiones of the present invention may be obtained by heating approximately molar equivalents, or a slight excess of amine, of an appropriate anhydride of a bi- or tricyclic-spiro-gem-diacetic or spiro-gem-carboxyacetic acid with ammonia or the appropriate primary amine sufficiently to form the azadispirodione, or imide, by elimination of water between the anhydride and the ammonia or primary amine reactants. A temperature of from 140° to 240° C. generally suffices for this purpose while a temperature of from 160 to 220° C. is preferred. In Formula III below a spiro-gem-diacid is illustrated which may readily be converted to a spiro-gem-anhydride (Formula IV) which may be used in preparing the imides and free bases of the present invention:

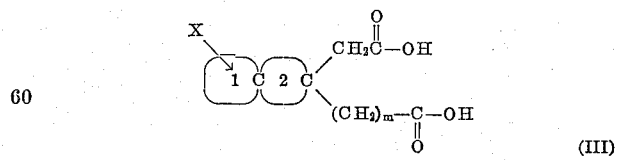

(III)

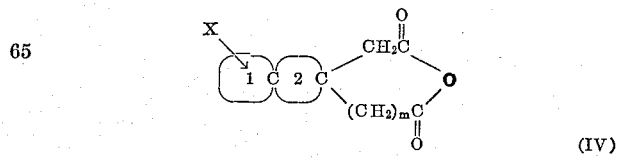

(IV)

In Formulae III and IV, all terms have the same significance as described for previous corresponding formulae and *m* is 0 or 1, depending upon whether a gem-carboxyacetic or gem-diacetic anhydride is to be used.

In preparing the novel compounds of the present invention, a wide variety of starting materials may be utilized, depending upon the values of X, R and rings 1, 2 and 3 desired. Merely by way of illustration, the following anhydrides of spiro-gem-diacids may be employed:

spiro[5.5]undecane-3,3-diacetic;
spiro[5.5]undecane-3-carboxy-3-acetic;
8-methyl-spiro[5.5]undecane-3,3-diacetic;
9-methyl-spiro[5.5]undecane-3-carboxy-3-acetic;
9-tert. butyl-spiro[5.5]undecane-3,3-diacetic;
9-methoxy-spiro[5.5]undecane-3,3-diacetic;
spiro[4.5]decane-3,3-diacetic;
8-methyl-spiro[4.5]decane-3-carboxy-3-acetic;
spiro[4.4]nonane-2,2-diacetic;
7-methyl-spiro[4.4]nonane-2,2-diacetic;
spiro-trans-decaline(2,4')cyclohexane-1',1'-diacetic;
spiro[6.5]dodecane-3,3-diacetic;
spiro[14.4]nonadecane-2,2-diacetic;
9-ethoxy-spiro[5.5]undecane-3,3-diacetic;
8-allyl-spiro[4.5]decane-3-carboxy-3-acetic;
7-butoxy-spiro[4.4]nonane-2,2-diacetic anhydrides.

Also by way of illustration, any of the following primary amines may be reacted with any of the foregoing anhydrides to produce novel products within the framework of the present invention, said amines being listed by class merely for ease of reference:

(1) ammonia;
(2) alkylamines—methyl, dodecyl, eicosyl, isobutyl;
(3) alkenylamines—allyl, methaly, oeyl, croty;
(4) alkynylamines—propargyl;
(5) alkoxyalkylamines—methoxypropyl, ethoxyethyl, methoxydecyl;
(6) cycloalkylamines-cyclohexyl, cyclopentyl, cyclooctyl;
(7) arylamines—aniline, the anisidines, aminopyridines, aminoquinolines, naphthylamines, p-chloraniline, 3,4-dimethoxyaniline, 2-aminothiazole, 2-amino-1,2,3,4-tetrahydroquinoline, 2 - amino-1,2,3,4-tetrahydronaphthalene;
(8) heterocycles—1-amino-morpholine, 2-amino-morpholine, 3-amino-piperidine, 1-amino-pyrrolidine, α-amino-piperazine;
(9) dialkylaminoalkylamines, dialkenylaminoalkylamines, heterocyclicalkylamines—diallylaminoethyl, dimethylaminohexyl, dihexylaminoethyl, dimethylaminoallyl, morpholinohexyl, 2,6-dimethylmorpholinopropyl, 3-(4-methyliperazino) propyl, pyrrolidinoethyl, piperidinobutyl;
(10) aralkylamines—phenylethyl, benzyl, 2-amino ethylpyridine, benzhydryl, p-chlorophenylpropyl;
(11) cycloalkylalkylamines—2-aminoethylcyclohexyl;
(12) alkylaminoalkyl and alkenylamino alkylamines—methylaminobutyl, allylaminopropyl;
(13) alkylaminoalkanolamines—1-amino-3-diethylamino-2-propanol.

Quite obviously, still other materials within the framework of the present invention could be enumerated, but it would serve no useful purpose to do so, it being sufficient to state that any anhydrides and primary amines having the structure of the type previously indicated and which are stable under the aforementioned synthesizing conditions can be utilized in accordance with the present invention. This would obviously include various of the above materials in substituted form, such, for example, as the partially nuclear hydrogenated or other nuclear substituted derivatives of materials such as the aralkylamines or the arylamines, etc.

In addition to the novel azadispirodiones and azadispiranes disclosed herein, the present invention contemplates the conversion of these two classes of compounds into their non-toxic, therapeutically useful acid addition and quaternary salts. Formula V illustrates the types of salts formed from the azadispiranes:

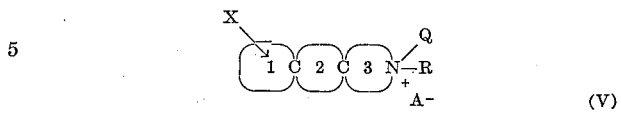

(V)

When R is represented by any of the groups (a)–(i) previously enumerated which do not contain basic nitrogen atoms, salts are formed on the ring 3 nitrogen only. When R contains a basic nitrogen atom (i.e., pyridyl, quinolyl, morpholinyl), however, salts may be formed on this nitrogen atom as well and diacid and diquaternary salts will be formed. In all cases, Q is either hydrogen or an alkyl or alkenyl group preferably containing 22 chain atoms or less and A⁻ is a non-toxic acid anion such as chloride, acetate, bromide, sulfate, perchlorate, mucate, succinate, phosphate, etc. In general, those non-toxic salts which are soluble in water or other well-tolerated solvents are particularly useful for therapeutic purposes due to the ease of administration of the salts in their dissolved form.

In case of the azadispirodiones, salting does not occur in any case on the ring 3 nitrogen. Salting of the diones may be obtained when R contains a basic nitrogen atom (i.e., pyridyl, quinolyl, morpholinyl).

The novel compounds of the present invention have a variety of useful properties. The acids and anhydrides are, of course, useful as intermediates in preparing the imides of the present invention. The imides, in turn, are useful in preparing the novel free bases of the present invention.

In general, the free bases and their acid addition salts as previously discribed have useful pharmacological properties, such compounds producing effects on the central nervous system. Generally speaking, the bis-quaternary salts of all of the free bases having a basic nitrogen atom in addition to the ring 3 nitrogen have gangliophelgic properties and produce ganglionic blockade in varying degrees of sympathetic and parasympathetic ganglia.

The free bases and non-toxic acid addition salts of the type of compounds shown by Examples II(E) and VIII(B) possess in varying degree antihistaminic properties. The bis-quaternary salts of compounds of the type shown in Examples 55(F) and VIII(C) are potent ganglionic blocking agents and produce marked hypotension in hypertensive dogs at very low doses. The dione shown in Example I(A) possesses analeptic properties. The base of Example VI (B) is a central nervous stimulant. The majority of the alkyl, alkenyl, alkynyl and alkoxy alkyl diones have central nervous depressing or stimulating properties depending on the substituent R.

The following working examples will serve to illustrate the methods employed to obtain the compounds of the present invention. Since the necessary intermediate acids and anhydrides are also novel, the preparation of representative examples of these is also illustrated.

*Example I.—3-azadispiro[5.5.5]hexadecane*

(A) *The imide: 3-azadispiro[5.5.5]hexadecane-2,4-dione.*—Nine gms. of spiro[5.5]undecane-3,3-diacetic anhydride was reacted with an excess of concentrated aqueous ammonia, excess water boiled off and the residue heated at 180° C. for ½ hour. The residue solidified and on recrystallization from acetone-water melted at 239–240° C.

(B) *The base hydrochloride.*—The imide from (A) above was reduced with lithium aluminum hydride in anhydrous ether, the complex decomposed with a slight excess of water, inorganic salts filtered off, the etheral filtrate dried over anhydrous sodium sulfate and the sodium sulfate removed by filtration. On bubbling gaseous hydrogen chloride into the ether solution of the base, there was precipitated 3-azadispiro[5.5.5]hexadecane, hydrochloride (M.P. 357–359° C. decomposition). Recrystallization from methanol-ether gave a product having a melting point of 358–360° C. dec.

Example II.—3-(3-dimethylaminopropyl)-3-azadispiro[5.5.5]hexadecane (A) *The imide: 3-(3-dimethylaminopropyl)-3-azadispiro]5.5.5]hexadecane-2,4-dione.*—Reaction of 9 gm. of spiro[5.5]undecane-3,3-diacetic anhydride with a 10% molar excess of 3-dimethylaminopropylamine and cyclization at 180–200° C. for ½ hour gave the title imide in quantitative yield. The crude imide solidified and melted between 50–55° C. Recrystallization from acetone-water gave a product having a melting point of 55–56° C.

(B) *Imide hydrochloride.*—Treatment of the imide from (A) above with gaseous hydrogen chloride in ether gave the hydrochloride salt, which melted at 200–201° C.

(C) *Imide methiodide.*—Treatment of the imide from (A) above with a 10% molar excess of methyl iodide in ethyl acetate and refluxing ½ hour, cooling and diluting with an equal volume of ether, gave a quantitative yield of the desired methiodide, which melted at 292–294° C. dec.

(D) *The title base.*—Reduction of the imide from (A) above with lithium aluminum hydride in anhydrous ether and working up as described in Example I(B) gave the title base in 87% yield with a boiling point of 135–145° C./0.08 mm.

(E) *Title base dihydrochloride.*—Treatment of the base in anhydrous ether with gaseous hydrogen chloride gave the desired salt, which melted at 322–323° C. dec.

(F) *Title base dimethiodide.*—Treatment of the base in anhydrous isopropyl alcohol with a 10% molar excess of methyl iodide and refluxing for several hours gave a quantitative yield of the desired bis-methonium salt on cooling and diluting with ether. The bis-methonium salt melted at 285–286° C. dec.

Example III.—2-methyl-2-azadispiro[5.5.4]pentadecane-1,3-dione

Reaction of 0.05 mole of spiro [5.5]undecane-3-carboxy-3-acetic anhydride with a large molar excess of saturated aqueous methylamine solution, boiling off excess water and heating at 160–180° C. for 20 minutes gave a quantitative yield of the title imide. This imide melted at 108–109° C. on recrystallization from acetone-water.

Example IV.—2-methyl-2-azadispiro-[5.5.4]pentadecane (A) *The title base.*—Reduction of the imide from Example III with lithium aluminum hydride as described in Example I(B) gave the desired base, which boiled at 85–90° C./0.12 mm.

(B) *Hydrochloride.*—This was formed as described in Example II(B) and melted at 256–257° C.

(C) *Methiodide.*—This was formed as described in Example II(C) and melted at 294–295° C.

Example V.—2-allyl-2-azadispiro-[5.5.4]pentadecane-1,3-dione

Reaction of 0.05 mole of spiro[5.5]undecane-3-carboxy-3-acetic anhydride with a slight molar excess of allyl amine and heating at 160–180° C. for 20 minutes gave a quantitative yield of the desired imide. The product had a melting point of 101–102° C. after recrystallization from acetone-water.

Example VI.—2-allyl-2-azadispiro-[5.5.4]pentadecane (A) *The title base.*—Reduction of the imide from Example V with lithium aluminum hydride as described in Example I(B) gave the desired base in 88% yield with a boiling point of 90–95° C./0.08 mm.

(B) *Hydrochloride.*—This was formed as in Example II(B) and melted at 203–204° C.

(C) *Methonium salt.*—This was formed as in Example II(C) and melted at 169–170° C.

Example VII.—2-(3-morpholinopropyl)-2-azadispiro-[5.5.4]pentadecane-1,3-dione (A) *Imide.*—Reaction of spiro[5.5]undecane-3-carboxy-3-acetic anhydride with a 10% molar excess of 3-morpholinopropylamine and heating at 200–220° C. for an hour gave the title imide in quantitative yield. It melted at 109–110° C.

(B) *Imide hydrochloride.*—Treatment of the imide in anhydrous ether with gaseous hydrogen chloride yielded the desired imide hydrochloride salt (M.P. 247–248° C.).

(C) *Imide methiodide.*—Refluxing the imide from (A) above with a 10% molar excess of methyl iodide in ethyl acetate for an hour, cooling and adding an equal volume of ether, gave the desired methonium salt (M.P. 240–241° C.).

Example VIII.—2-(3-morpholinopropyl)-2-azadispiro-[5.5.4]pentadecane (A) *The title base.*—Reduction of the imide from Example VII(A) with lithium aluminum hydride as described in Example I(B) gave the title base in 84% yield (B.P. 158–165° C./0.18 mm.).

(B) *Base dihydrochloride.*—This was obtained as in Example II(E) and melted at 292–293° C.

(C) *Base dimethonium salt.*—This was obtained as in Example II(F) and melted at 253–254° C. dec.

Examples IX and X are illustrative examples of the synthesis of the necessary intermediate gem-spiro diacetic and gem-spiro-carboxy-acetic acids and their anhydrides.

Example IX.—spiro[5.5]undecane-3,3-diacetic acid and anhydride (A) *The acid.*—Spiro[5.5]undecanone-3, 33.2 gm. (0.2 mole), was placed in a thick-walled 500 ml. Pyrex flask and treated with 0.42 mole of ethyl cyanoacetate and 100 ml. of absolute alcohol saturated with anhydrous ammonia gas at 0° C. The reactants were thoroughly mixed, stoppered tightly and let set in the ice chest for one week at 0–5° C. During this time a voluminous white precipitate formed that gradually settled leaving a yellowish-green supernatant. The precipitate was removed by filtration and washed several times with ether. The residue was dissolved in the minimum of boiling water, filtered and made strongly acid with concentrated hydrochloric acid (300 ml./per liter of filtrate). A voluminous white precipitate formed. The mixture was cooled in the refrigerator overnight and the precipitate removed by filtration, washed copiously with water and dried. This is the dicyanoimide of spiro[5.5]undecanone-3(1,5-dicyano-3-azadispiro[5.5.5]hexadecane-2,4-dione). It melted at 232–233° C. and 25 gm. of purified dicyanoimide were obtained. The dried dicyanoimide was dissolved in 75 ml. of concentrated sulfuric acid, with the aid of heat as necessary, and allowed to stand overnight. The next day sufficient water was added through an efficient reflux condenser to bring the sulfuric acid to 66–70% w./w. and the mixture refluxed for 24–30 hours. Following the reflux period, the mixture was cooled and diluted with twice its volume of water and refrigerated overnight. The precipitate was removed by filtration, dissolved in potassium bicarbonate, decolorized with Norit A, filtered and acidified with concentrated hydrochloric acid (2–300 ml./liter of filtrate). Spiro[5.5]undecane-3,3-diacetic acid precipitated and was removed by filtration after cooling overnight in the refrigerator. There was obtained 19.5 gm. of purified acid after recrystallization from benzene-petroleum ether, which melted at 221–222° C.

(B) *The anhydride.*—Refluxing the acid from (A) above with 3–5 molar equivalents of acetic anhydride and removal of the acetic anhydride at the water pump gave the desired anhydride (17.5 gm., 96% yield, M.P. 126–127° C.).

*Example X.—Spiro [5.5]undecane-3-carboxy-3-acetic acid and anhydride*

(A) *The acid.*—Spiro[5.5]undecanone-3, 34 gm. (0.2 mole), was refluxed with 0.21 mole of ethyl cyanoacetate and 1 ml. of piperidine. The reflux was equipped with a Dean-Stark type trap and water formed during the reaction was trapped under benzene and removed from the reaction mixture. At the end of this period, when no more water collected in the trap, the reflux mixture was poured with rapid stirring into ice water. The desired ester, ethyl-α-cyano-α-(spiro[5.5]undecylidene) acetate, solidified. On recrystallization from acetone-water, it melted at 54–55° C. There was obtained 38 gm. of the ester. The ester was dissolved in approximately 100 ml. of ethanol and a 3–5 molar excess of a 50% aqueous solution of potassium cyanide added. The mixture was mixed thoroughly, stoppered and let set 3 days. After this time all alcohol and water were removed in a rotary vacuum evaporator until a brownish-yellow, slightly tacky powder remained. The residue was fitted with an efficient reflux condenser and concentrated hydrochloric acid added slowly through the condenser until evolution of hydrogen cyanide ceased. A total of approximately 300 ml. of conc. hydrochloric acid was added and the mixture refluxed for 24–30 hours. After the reflux period, the mixture was diluted with an equal volume of water and refrigerated overnight. The precipitate was removed by filtration and the crude acid purified as detailed in Example IX(A). There was obtained 27 gm. of purified acid having a melting point of 185–186° C.

(B) *The anhydride.*—This was obtained as detailed in Example IX(B). It melted at 141–142° C.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A compound selected from the group of compounds consisting of (1) compounds of the formula

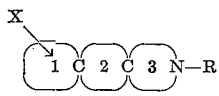

wherein ring 1 is selected from the group consisting of mono- and bicarbocyclic rings of 5–15 ring atoms; ring 2 is carbocyclic ring of 5–6 ring atoms; ring 3 is a ring of 5–6 ring atoms one of which is nitrogen and the rest of which are carbon; X is at least one substituent on ring 1 selected from the group consisting of at least one of hydrogen, alkyl, alkenyl and alkoxy, the latter three each having up to 6 chain atoms; and R is selected from the group consisting of:

(a) a hydrogen;
(b) alkyl, alkenyl, alkoxyalkyl and alkynyl, each of up to 22 chain atoms;
(c) cycloalkyl and aryl, each of up to 22 ring atoms;
(d) a heterocyclic group selected from the class consisting of morpholino, pyrrolidino, piperidino and piperazino; and
(e) —R'—R", wherein R' is selected from the group consisting of alkylene, alkenylene, and alkylene and alkenylene substituted by a hydroxyl group on a carbon atom at least β to all nitrogen atoms, said R' having up to 6 chain atoms; and R" is selected from the group consisting of:
(1) aryl and cycloalkyl, each of up to 22 ring atoms;
(2) dialkylamino;
(3) alkylamino;
(4) dialkenylamino;
(5) alkenylamino;
each of the alkyl and alkenyl groups in (2) (3) (4) and (5) above having up to 22 chain atoms; and
(6) a heterocyclic group selected from the group consisting of morpholino, pyrrolidino, piperidino and piperazino;

(2) the non-toxic, pharmaceutically acceptable acid addition salts of compounds (1); and (3) the non-toxic, pharmaceutically acceptable quaternary salts of compounds (1) of the formula:

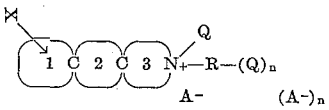

wherein rings 1, 2 and 3, X and R have the values set forth above; A⁻ is a pharmaceutically acceptable non-toxic anion; Q is selected from the group consisting of alkyl and alkenyl; n is 0–1 when R contains a basic nitrogen atom, Q being attached to said nitrogen atom when n is 1; and n is zero when R contains no basic nitrogen atom.

2. A compound selected from the group of compounds consisting of (1) compounds of the formula

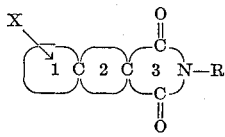

wherein ring 1 is selected from the group consisting of mono- and bicarbocyclic rings of 5–15 ring atoms; ring 2 is a carbocyclic ring of 5–6 ring atoms; ring 3 is a ring of 5–6 ring atoms one of which is nitrogen and the rest of which are carbon; X is at least one substituent on ring 1 selected from the group consisting of at least one of hydrogen, alkyl, alkenyl and alkoxy, the latter three each having up to 6 chain atoms; and R is selected from the group consisting of:

(a) hydrogen;
(b) alkyl, alkenyl, alkoxyalkyl and alkynyl, each of up to 22 chain atoms;
(c) cycloalkyl and aryl, each of up to 22 ring atoms;
(d) a heterocyclic group selected from the class consisting of morpholino, pyrrolidino, piperidino and piperazino; and
(e) —R'—R", wherein R' is selected from the group consisting of alkylene, alkenylene, and alkylene and alkenylene substituted by a hydroxyl group on a carbon atom at least β to all nitrogen atoms, said R' having up to 6 chain atoms; and R" is selected from the group consisting of:
(1) aryl and cycloalkyl, each of up to 22 ring atoms;
(2) dialkylamino;
(3) alkylamino;
(4) dialkenylamino;
(5) alkenylamino;
each of the alkyl and alkenyl groups in (2) (3) (4) and (5) above having up to 22 chain atoms; and
(6) a heterocyclic group selected from the group consisting of morpholino, pyrrolidino, piperidino and piperazino;

(2) the non-toxic, pharmaceutically acceptable acid addition salts of compounds (1); and (3) the non-toxic, pharmaceutically acceptable quaternary salts of compounds (1) of the formula

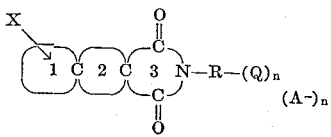

wherein rings 1, 2 and 3, X and R have the values set forth above; $A^-$ is a pharmaceutically acceptable non-toxic anion; Q is selected from the group consisting of alkyl and alkenyl; $n$ is zero when R contains no basic nitrogen atom; and R is 1 when R contains a basic nitrogen atom, Q being attached to said nitrogen atom.

3. A compound selected from the group of compounds of the formula:

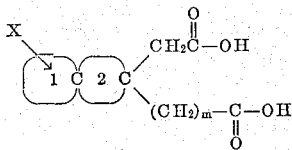

wherein $m$ is 0–1; ring 1 is selected from the group consisting of mono- and bicarbocyclic rings of 5–15 ring atoms; ring 2 is a carbocyclic ring of 5–6 ring atoms; and X is at least one substituent on ring 1 selected from the group consisting of at least one of hydrogen, alkyl, alkenyl and alkoxy, the latter three having up to 6 chain atoms.

4. A compound selected from the group of compounds of the formula:

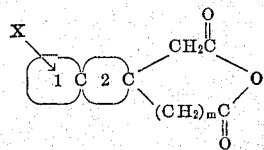

wherein $m$ is 0–1; ring 1 is selected from the group consisting of mono- and bicarbocyclic rings of 5–15 ring atoms; ring 2 is a carbocyclic ring of 5–6 ring atoms; and X is at least one substituent on ring 1 selected from the group consisting of at least one of hydrogen, alkyl, alkenyl and alkoxy, the latter three having up to 6 chain atoms.

5. 3-azadispiro[5.5.5]hexadecane.
6. 3 - (3 - dimethylaminopropyl) - 3 - azadispiro[5.5.5]hexadecane.
7. 2-methyl-2-azadispiro[5.5.4]pentadecane.
8. 2-allyl-2-azadispiro[5.5.4]pentadecane.
9. 2 - (3 - morpholinopropyl) - 2 - azadispiro[5.5.4]pentadecane.
10. spiro[5.5]undecane-3,3-diacetic acid.
11. spiro[5.5]undecane-3,3-diacetic anhydride.
12. spiro[5.5]undecane-3-carboxy-3-acetic acid.
13. spiro[5.5]undecane-3-carboxy-3-acetic anhydride.

No references cited.

NICHOLAS S. RIZZO, *Primary Examiner.*

ROBERT PRICE, JOSE TOVAR, *Assistant Examiner.*